April 24, 1962     E. W. WAGNER ETAL     3,030,904
CAN BODY SIDE SEAM SOLDERING MACHINE
Original Filed Jan. 2, 1957     6 Sheets-Sheet 6
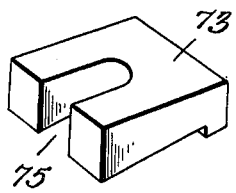
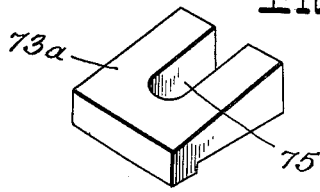
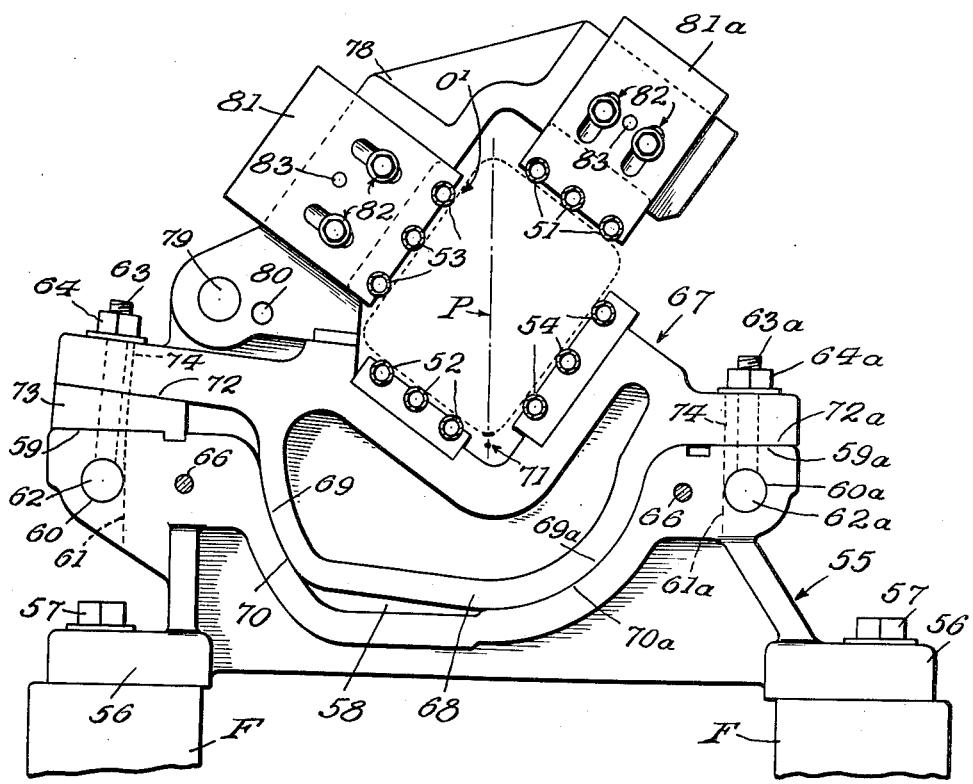
INVENTORS
*Edward W. Wagner*
*Charles W. Stetter*
BY *Mason, Porter, Diller & Stewart*
ATTORNEYS United States Patent Office 3,030,904
Patented Apr. 24, 1962

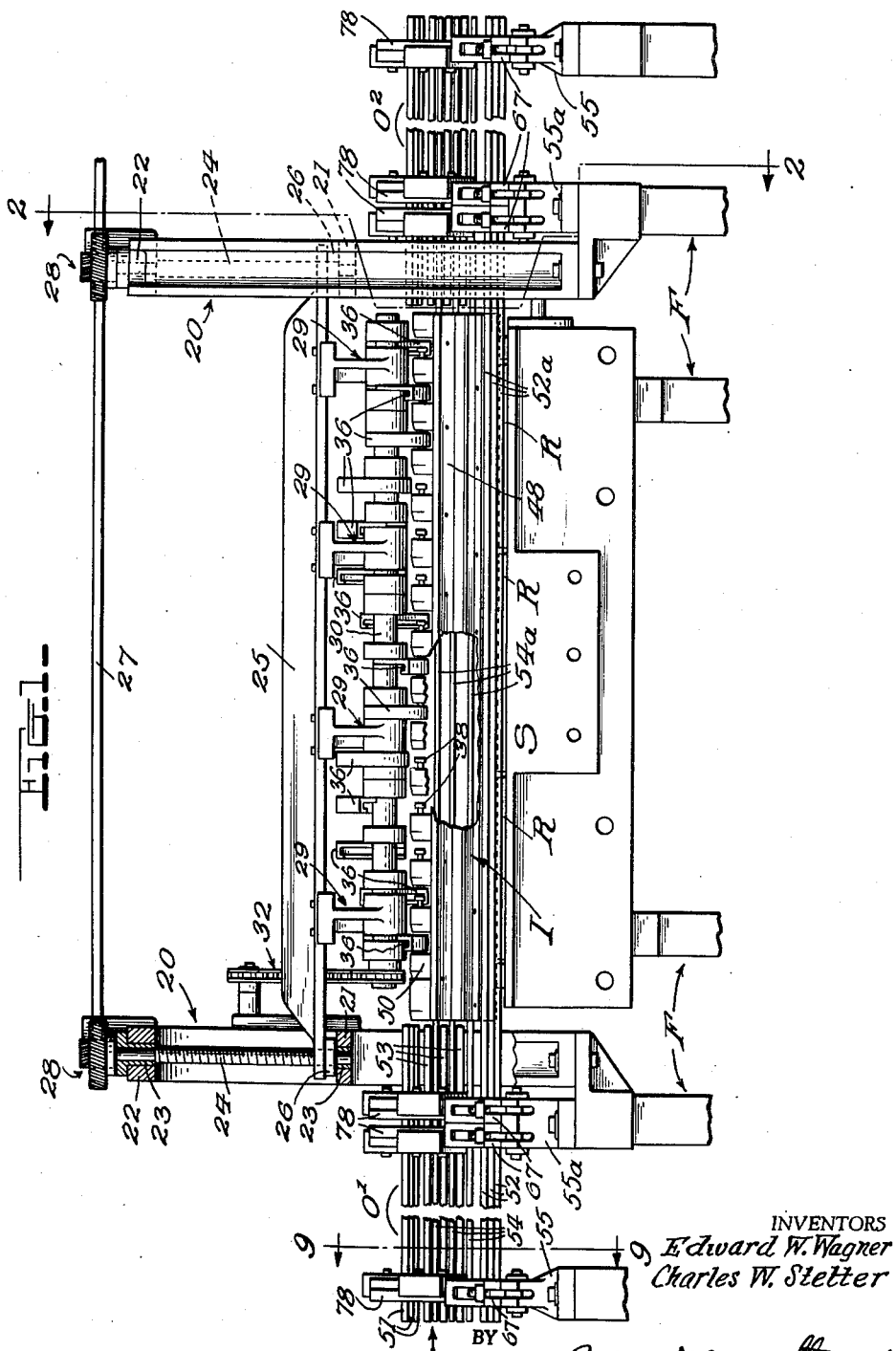

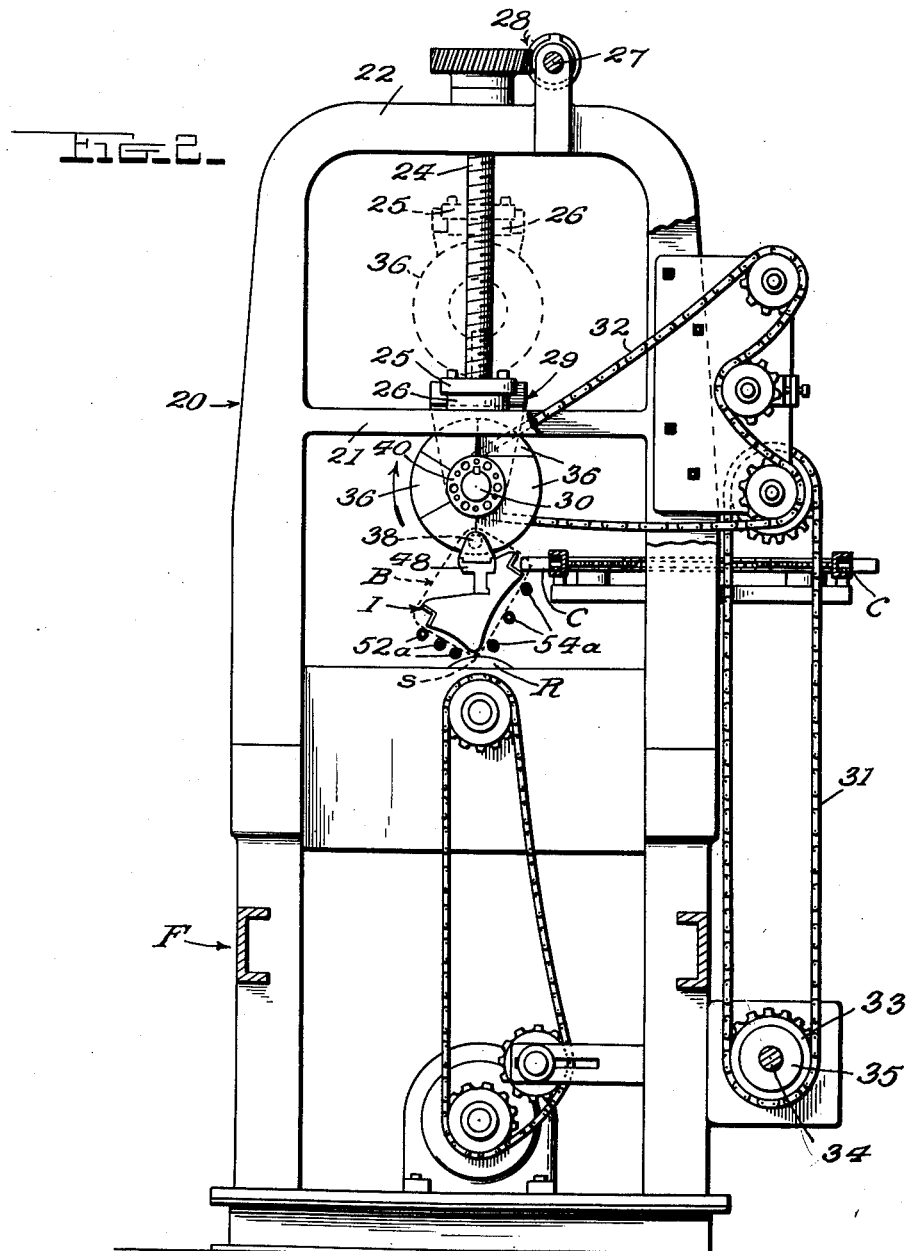

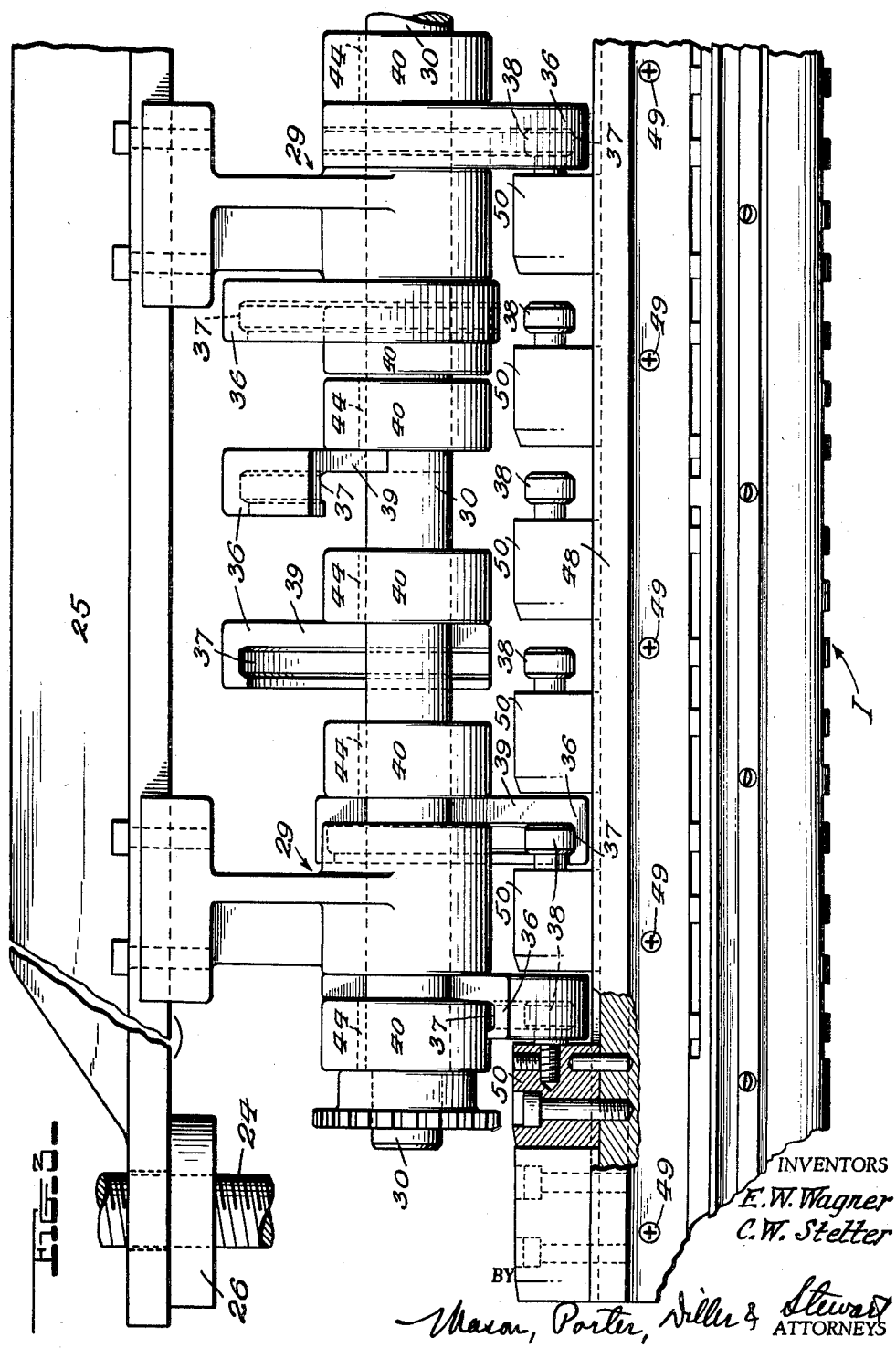

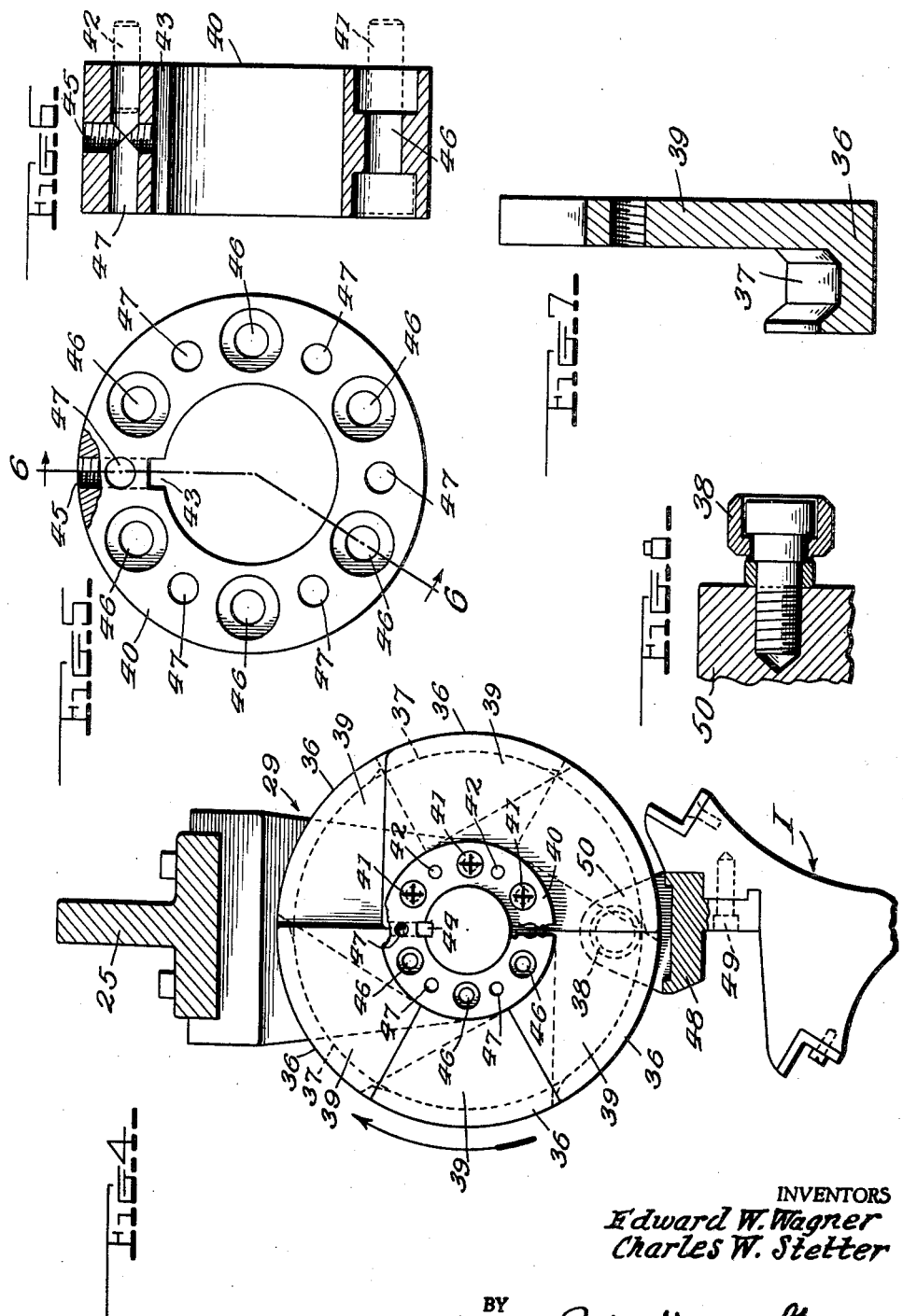

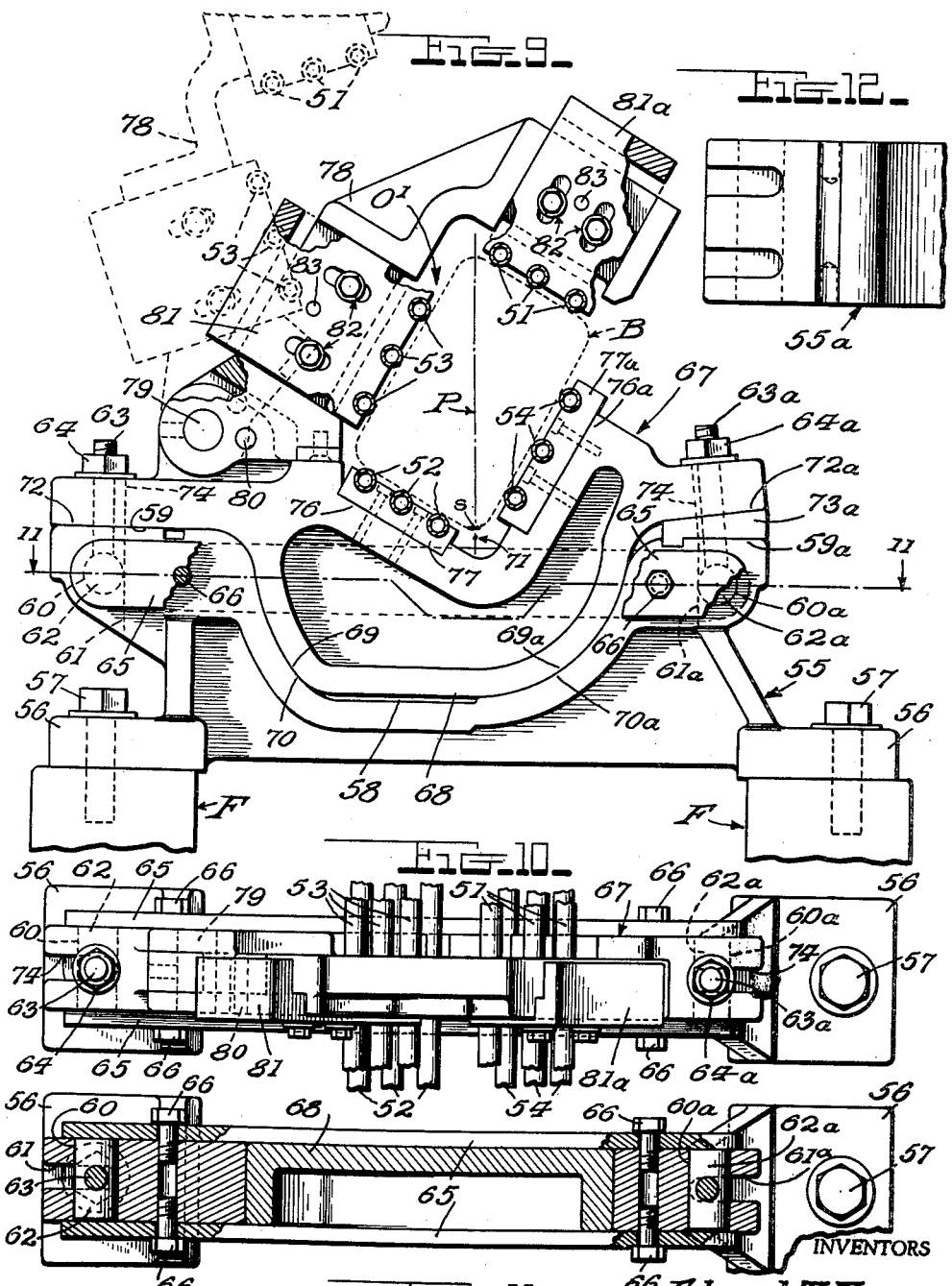

3,030,904
CAN BODY SIDE SEAM SOLDERING MACHINE
Edward W. Wagner, Maywood, and Charles W. Stetter, Paterson, N.J., assignors to Continental Can Company, Inc., New York, N.Y., a corporation of New York
Original application Jan. 2, 1957, Ser. No. 632,161. Divided and this application Apr. 17, 1959, Ser. No. 807,158
9 Claims. (Cl. 113—115)

This application is a division of our parent U.S. patent application, Serial No. 632,161, filed January 2, 1957.

This invention relates to machines for soldering or otherwise completing the side seams of metal can bodies as they are progressively fed along a predetermined path. The invention, however, does not relate to the actual soldering means but to novel means for guiding the can bodies through the machine while they are being heated and the side seams are being soldered and wiped, or possibly welded.

The machine disclosed includes an outside horse for guiding the can bodies to a soldering or other seam-completing station, an inside horn for guiding the can bodies through said seam completing station, and a second outside horse for guiding the seamed can bodies from said soldering station.

An object of the invention has been to provide such a machine which is readily adjustable for can bodies of different sizes and/or proportions and from which any damaged can body may be readily removed.

Each of the above mentioned outside horses is of the general type having longitudinal top, bottom and side members; and another object has been to mount the longitudinal members at the top and one side of the horse upon upwardly and laterally swingable arms which are pivoted to subjacent cradles upon which the longitudinal members at the bottom and other side of the horse are secured, thereby providing for quick and easy removal of any damaged can bodies.

Another object has been to make novel provision for adjusting the horse for guiding can bodies of different sizes.

In the disclosed machine, the outside horses and the inside horn are shaped to guide rectangular can bodies having their side seams at one longitudinal corner. It is essential that the seam corner of the can body be downwardly disposed for proper presentation to the solder applicator roll or other seam completing means; and the best results are attainable when the can bodies are so guided that said seam corner of each can body is intersected by a substantially vertical plane which also intersects the then uppermost corner of the can body; and another object of the invention has been to provide a novel outside horse structure which may be adjusted for handling can bodies of different sizes and will retain the stated relation of body corners and vertical plane regardless of the can size.

If the horse be simply adjusted as to size, from one can body size to another, it does not necessarily follow that the above stated relation of body corners and vertical plane will still remain. On the contrary, a plane through the two corners in question may be inclined instead of vertical. A further object has therefore been to provide novel means whereby the cradles upon which the horse is mounted may be tilted to bring the two can body corners into the desired vertical plane.

A still further object has been to provide novel structural features for permitting easy tilting adjustment of the cradles and for solidly holding them in adjusted position.

Yet another object has been to provide a generally improved construction which may be expeditiously manufactured and profitably sold at a reasonable price.

With the above and other objects in view that will hereinafter appear, the nature of the invention will be more clearly understood by reference to the following detailed description, the appended claims and the several views illustrated in the accompanying drawings.

In the drawings:

FIGURE 1 of the accompanying drawings is a side elevation partly broken away.

FIGURE 2 is a vertical transverse sectional view substantially on line 2—2 of FIGURE 1.

FIGURE 3 is an enlarged side elevation, partly broken away showing a portion of the inside horn and its suspending means.

FIGURE 4 is an enlarged end view, partly in section; showing the inside horn and its suspending means.

FIGURE 5 is a side elevation of one of the hubs which are utilized in securing the arcuate horn-suspending tracks to the shaft.

FIGURE 6 is a sectional view on line 6—6 of FIGURE 5.

FIGURE 7 is an enlarged sectional view through one of the arcuate tracks.

FIGURE 8 is an enlarged detail section of one of the track-engaging rollers and the lug by which it is carried.

FIGURE 9 is an enlarged transverse sectional view on line 9—9 of FIGURE 1 showing one of the mounting arms, cradles and bases employed for the outside horses.

FIGURE 10 is a top view of FIGURE 9.

FIGURE 11 is a horizontal sectional view on line 11—11 of FIGURE 9.

FIGURE 12 is a fragmentary top view showing one end of a base upon which two of the arms and cradles of FIGURES 9 to 11 may be mounted.

FIGURE 13 is a perspective view of the wedge shown at the right in FIGURE 9.

FIGURE 14 is a view similar to FIGURE 9 but showing the parts adjusted for a different size can body.

FIGURE 15 is a perspective view of the wedge shown at the left of FIGURE 14.

In FIGURE 1, the general association of elements is shown. Mounted on the frame F of the machine are an outside horse $O^1$ for guiding the can bodies to a soldering station A, an inside horn I for guiding the can bodies through said soldering station, and a second outside horse $O^2$ for guiding the seamed can bodies from said soldering station for seam wiping. The customary feed chain for the can bodies is shown at C in FIGURE 2. Conventional solder applicator rolls R are shown in FIGURES 1 and 2 for soldering the side seams s of the can bodies B during their passage through the soldering station S. These can bodies B, in the present disclosure, are rectangular, and the outside horses $O^1$ and $O^2$, and the inside horn I are accordingly of generally rectangular cross section.

The machine frame F includes two fixed arched frames 20, said frames being disposed at the ends of the soldering station S and being proportioned to extend well above the path of can body travel. Each frame 20 includes a transverse bar 21 spaced downwardly from its crown bar 22, and these bars 21, 22 are provided with bearings 23 in which a vertical screw 24 is rotatably mounted. A bridge bar 25 extends longitudinally over the inside horn I and has nuts 26 on its ends engaged by the two screws 24.

*Inside Horn and Suspending Means*

The horn I, claimed specifically in parent application Serial No. 622,161, filed January 2, 1957, is suspended from the bridge bar 25 and when this bar is in its maximum lowered position, with the nuts 26 resting on the transverse frame bars 21, said horn is operatively aligned with the outside horses $O^1$ and $O^2$. By means of the screws 24, however, the bar 25 and the suspended horn I may be upwardly shifted (dotted lines in FIGURE 2) to raise the horn I well above its normal position. This not only allows easy access to any can body which might by any possibility become damaged on the horn I, but it gives easy access to said horn when one of a different transverse size is to be substituted for handling can bodies of a different size. The two screws 24 are connected by a suitable operating shaft 27 and gearing 28 for operation in unison.

Aligned bearings 29 (FIGURES 1 to 4) are secured to and project downwardly from the bridge bar 25, and a shaft 30 is rotatably mounted in said bearings. This shaft is driven synchronously with the feed chain C by means of a lower sprocket chain 31 (FIGURE 2) and an upper sprocket chain 32 (FIGURES 1 and 2). The drive sprocket 33 for the chain 31 is connected with the drive shaft 34 from which the feed chain C is driven in conventional manner. A clutch 35 preferably connects the sprocket 33 with the drive shaft 34 to throw-out in case of overload but the clutch construction forms no part of the present invention.

Arcuate, horn-suspending tracks 36 are secured to the shaft 30 and are uniformly spaced apart along the same, said arcuate tracks being disposed in helically offset relation as most clearly shown in FIGURE 4. These tracks are all concentric with the shaft 30; and the actual track surfaces 37 all face said shaft and are uniformly spaced therefrom. The arcuate spacing of the succeeding tracks to dispose them in helically offset relation is preferably 60°; and adjacent tracks preferably overlap a few degrees.

The upper portion of the inside horn I is provided with downwardly facing shoulders equal in number with the arcuate tracks 36, said shoulders being preferably constituted by rollers 38. The tracks 36 pass under these rollers as the shaft 30 rotates and thereby suspend the horn I. Due to the helically offset relation of the tracks, they progressively disengage from their respective rollers 38 as any can body B approaches and then re-engage said rollers after the can body passes. The tracks can therefore offer no obstruction to advance of the can bodies and there are always a sufficient number of the tracks and rollers engaged to effectively suspend the horn in operative position.

The track surfaces 37 are longitudinally channeled as shown more particularly in FIGURES 3 and 7 and the rollers 38 are shaped for snug reception in the channels as seen also in these views. The tracks 36 and rollers 38 thus coact in holding the horn I against longitudinal movement.

It is preferable to provide the arcuate tracks 36 with identical integral plates 39 (FIGURES 3, 4 and 7) secured by screws and dowel pins to hubs 40. The screws are shown at 41 in FIGURE 4 and one of these screws is shown in dotted lines in FIGURE 6. The dowel pins are shown at 42 in FIGURE 4 and one of these dowel pins is shown in dotted lines in FIGURE 6. For convenience of manufacture all of the hubs 40 are identical. Each hub has a keyway 43 (FIGURES 5 and 6) to receive a key 44 for securing it to the shaft 30; and each hub also has an opening 45 to receive a set screw for locking the hub. Each hub has circumferentially spaced openings 46 (FIGURES 5 and 6) and other circumferentially spaced openings 47. Some of the openings 46 of each hub 40 receive the track-attaching screws 41 (FIGURE 4) and some of the openings 47 receive the dowel pins 42. The remaining openings of each hub remain unoccupied.

In order to simplify substitution of one size horn for another, the rollers 38 are all carried by a longitudinal bar 48 (see more particularly FIGURES 3 and 4). The body of the horn I is detachably secured at 49 to this bar. Lugs 50 are secured upon and project upwardly from bar 48, and the rollers 38 are mounted on these lugs, preferably in the manner shown in FIGURE 8. The lugs 50 are shaped to smoothly contact with the upper corners of the can bodies B and in fact jointly constitute the upper corner of the horn I. The spaces between these lugs constitute transverse recesses within which the rollers 38 are confined and through which the arcuate tracks 36 are movable.

*Outside Horses and Mounting Means*

The two outside horses $O^1$ and $O^2$ are each composed of a top set of tubes 51, a bottom set of tubes 52, a front set of tubes 53 and a rear set of tubes 54, all of said tubes extending longitudinally of the horse. Each horse is thus adapted for guiding rectangular can bodies B with their seam corners disposed downwardly for seam soldering, as shown more particularly in FIGURES 2, 9 and 14. For attaining the best cooperation between the seams and the solder applicator rolls R, the seam corner of each can body should be intersected by a vertical plane which also intersects the then uppermost corner of the can body, as indicated by the broken line P in FIGURES 9 and 14. However, the top tubes 51 are adjustable toward and from the bottom tubes 52, and the front tubes 53 are adjustable toward and from the rear tubes 54, to change the horse from one size can body to another, and when such adjustments are made it does not necessarily follow that the above mentioned relation of can body corners and plane P will exist. On the contrary, a plane through the seam corner of the can body and the then uppermost corner of said can body will usually be inclined. According to the invention, however, the horse is mounted in a novel manner on tiltable cradles which permit restoration of the desired relation of can body corners and plane P. Moreover, provision is made whereby the top tubes 51 and the front tubes 53 may be swung forwardly to give easy and complete access to any can body which may be damaged and must therefore be removed from the horse. The preferred construction for attaining these results is disclosed primarily in FIGURES 9 to 14. These views illustrate one of a plurality of units employed for mounting and adjusting each horse and such units may be employed at any desired points, preferably at the ends and also between the ends of each horse. A description of one of the units will suffice, and reference is again made to FIGURES 9 to 14.

An elongated saddle or base 55, hereinafter called a base, extends transversely under the horse and is provided at its ends with feet 56 to be bolted at 57 upon parts of the machine frame F. The base 55 has an upwardly open recess 58 between its ends, a flat top surface 59 at one end of said recess 58, and a second flat top surface 59a at the other end of said recess, said top surface being in the same horizontal plane. Under the surfaces 59 and 59a, respectively, the base 55 is formed with openings 60 and 60a, the axes of these openings being parallel with the length of the horse. The base 55 is also formed with notches 61 and 61a intersected by the openings 60 and 60a, respectively, and extending to the ends of the base.

Rocker pins 62 and 62a are turnably received in the openings 60 and 60a, respectively, and have their ends substantially flush with the opposite vertical sides of the base 55. The rocker pins 62 and 62a carry stud bolts 63 and 63a, respectively, which extend upwardly through the notches 61 and 61a and have nuts 64, 64a on their upper ends. These bolts are instrumental in securing a cradle, hereinafter described, upon the base 55 and when said bolts are released they are outwardly swingable through the notches 61 and 61a.

Two horizontal bars 65 are secured at 66 against the opposite vertical sides of the base 55 and their ends extend across the ends of the openings 60 and 60a to hold the rocker pins 62, 62a against endwise dislocation in said openings. The intermediate portions of the bars 65 span the sides of the recess 58 for a purpose to appear.

An elongated cradle 67 extends transversely under the horse and is tiltably mounted upon the base 55. Between its ends, this cradle is provided with a downwardly projecting lobe 68 received in the recess 58 of the base 55, the sides of said lobe being in contact with the inner sides of the bars 65. One end of the lobe 68 and the corresponding end of the recess 58 are formed with contacting arcuate faces 69 and 70. The other end of the lobe and the corresponding end of the recess have similar contacting faces 69a and 70a. All of the surfaces 69, 70, 69a and 70a are concentric with an axis 71 extending longitudinally of the horn and near the seam corners of the can bodies, said axis being preferably on the plane P. While the cradle 67 is being tilted, the faces 69 and 69a slide on each other and the same is true of the surfaces 70 and 70a. After such tilting, these contacting surfaces aid in solidly supporting the cradle.

At one end of the lobe 68, the cradle 67 has a flat bottom surface 72 for contact (FIGURE 9) with the top surface 59 of the base 55 or with a wedge 73 (FIGURES 14 and 15) interposed between said surfaces 72 and 59. At the other end of the lobe 68, the cradle 67 is provided with a second bottom surface 72a for contact (FIGURE 14) with the top surface 59a of the base 55 or with a wedge 73a (FIGURE 9) interposed between these surfaces 72a and 59a. When the surfaces 59 and 72 are in contact (FIGURE 9) the surfaces 59a and 72a are at an acute angle to each other and this angle is occupied by the wedge 73a. Similarly, when the surfaces 59a and 72a are in contact (FIGURE 14) the surfaces 59 and 72 are at an acute angle to each other and the wedge 73 occupies this angle.

The ends of the cradle 67 are notched at 74 and the wedges are notched at 75 for reception of the bolts 63 and 63a, and when these bolts are tightened said cradle 67 is solidly held on the base 55 and is held against displacement, longitudinally of the horse, by contact of the lobe 68 with the base-carried bars 65.

The cradle 67 has an inclined seat 76 upon which a block 77 is secured, the bottom set of tubes 52 being secured to said block 77. The cradle also has a second inclined seat 76a to which a block 77a is secured, the rear tubes 54 being secured to this block 77a.

An angular arm 78 is pivoted at 79 to the cradle 67 at the front of the horse, for movement forwardly from the latter; and a removable pin 80 normally locks said arm against pivotal movement. This arm 78 carries one slide block 81 to which the front tubes 53 are secured, and a second slide block 81a to which the top tubes 51 are secured. These blocks have clamp-screw-and-slot-connections 82 with the arm 78; and dowel pins 83 may be employed for locking said slide blocks in set positions.

The slide block 81 permits adjustment of the front tubes 53 toward and from the back tubes 54; and the slide block 81a allows adjustment of the top tubes 51 toward and from the bottom tubes 52, thus permitting adjustment of the horse for handling can bodies of different sizes. When making such an adjustment, if it be found that the upper and lower corners of the can bodies are in an inclined plane instead of in the vertical plane P, rectifying adjustment may be made by tilting the cradle 67 and utilizing one or the other of the wedges 73, 73a.

For the ends of each outside horse O¹ and O² toward the soldering station S, a double base 55a (FIGURES 1 and 12) is preferably employed, with two of the cradles 67 mounted on said base, and two of the arms 78 mounted on said cradles, respectively.

The top tubes 51 and the front tubes 53 do not of course extend through the soldering station S. However, additional bottom tubes 52a and back tubes 54a (FIGURES 1 and 2) extend through said station S and are mounted at their ends on the cradles 67 closest to said station.

From the foregoing, it will be seen that novel and advantageous construction has been disclosed for attaining the desired ends. However, it is to be understood that numerous variations may be made within the scope of the invention.

We claim:

1. In a mounting means for an outside horse of the general type having longitudinal top, bottom and side members, said members being relatively positioned to guide rectangular can bodies with the seam corner of each can body presented downwardly for seam completion, and intersected by a substantially vertical plane which also intersects the then upper corner of the can body; a cradle extending transversely under said horse, means fixedly mounting the longitudinal members at the bottom and one side of the horse on said cradle, adjustable means mounting the longitudinal members at the top and other side of the horse on said cradle for adjustment to adapt the horse for can bodies of different sizes, a supporting base for said cradle, and mounting means mounting said cradle on said base, said mounting means including cradle-adjusting means allowing tilting of said cradle about an axis extending longitudinally of said horse to properly position the seam corners of the can bodies for seam completion regardless of the size of the can bodies being conducted through the horse.

2. A structure as specified in claim 1; said axis being substantially on said vertical plane and near the seam corners of the can bodies.

3. A structure as specified in claim 1; said cradle adjusting means embodying wedge means for chocking said cradle in tilted position.

4. A structure as specified in claim 1; said cradle having one of its ends resting on the top of said base and having its other end disposed at a sharply acute angle to said top of said base, said cradle-adjusting means including a wedge in said angle, and releasable bolts securing said cradle on said base and also securing said wedge in place.

5. A structure as specified in claim 1; said cradle having one of its ends resting on the top of said base and having its other end disposed at a sharply acuate angle to said top of said base, said cradle-adjusting means including a wedge in said angle, and releasable bolts securing said cradle on said base and also securing said wedge in place, said bolts being pivoted to said base for outward swinging therefrom, said cradle and base having notches normally receiving said bolts and allowing said outward swinging of said bolts when the latter are released.

6. In a mounting means for an outside horse of the general type having longitudinal top, bottom and side members, said members being relatively positioned to guide rectangular can bodies with the seam corner of each can body presented downwardly for seam completion, and intersected by a substantially vertical plane which also intersects the then upper corner of the can body, a cradle extending transversely under said horse, said cradle having a downwardly projecting lobe between its ends, means fixedly mounting the longitudinal members at the bottom and one side of the horse on said cradle, adjustable means mounting the longitudinal members at the top and other side of the horse on said cradle for adjustment to adapt the horse for can bodies of different sizes, a supporting base for said cradle, said base extending under said cradle and having a recess receiving the aforesaid lobe, said lobe and recess having contacting surfaces curved about an axis extending longitudinally of the horse and supporting said cradle for tilting adjustment about said axis to properly position the seam corners of the can bodies for seam completion regardless of the size of the can bodies being conducted by the horse, and bolts securing said cradle to said base.

7. A structure as specified in claim 6; said axis being substantially on said vertical plane and near the seam corners of the can bodies.

8. A structure as specified in claim 6; said cradle having one of its ends resting on the top of said base at one end of said recess and having its other end disposed at a sharply acute angle to the top of said base at the other end of said recess, a wedge in this angle, and releasable bolts securing said cradle ends and said wedge to said base.

9. A structure as specified in claim 6; the ends of said base having horizontal openings formed therethrough on axes parallel with the aforesaid axis, pivot pins turnably positioned in said openings and connected to the lower ends of said bolts, the ends of said base and cradle having notches normally receiving said bolts and allowing outward swinging of said bolts when the latter are released, and two horizontal bars disposed in vertical planes and secured against opposite sides of said base, the opposite sides of said lobe being in contact with the inner sides of said bars, said bars having end portions extending across the ends of the aforesaid openings to hold the aforesaid pivot pins against endwise sliding.

References Cited in the file of this patent

UNITED STATES PATENTS

| | | |
|---|---|---|
| 741,620 | Brooks | Oct. 20, 1903 |
| 979,305 | Hunt | Dec. 20, 1910 |
| 1,883,539 | Cameron | Oct. 18, 1932 |
| 1,966,380 | Dodge et al. | July 10, 1934 |
| 2,103,074 | Gardner | Dec. 21, 1937 |